United States Patent [19]

Boettcher, Jr. et al.

[11] 4,238,688

[45] Dec. 9, 1980

[54] THREE-PHASE UNINTERRUPTIBLE POWER SUPPLY MAINTAINING RESERVE ENERGY SOURCES IN IDLING CONDITION WITH UNBALANCED LOADS

[75] Inventors: Charles W. Boettcher, Jr., Chester; Billy H. Hamilton, Summit; Walter L. Zweig, Rockaway, all of N.J.

[73] Assignee: Bell Telephone Laboratories, Incorporated, Murray Hill, N.J.

[21] Appl. No.: 953,429

[22] Filed: Oct. 23, 1978

[51] Int. Cl.³ .................................................. H02J 9/00
[52] U.S. Cl. ........................................ 307/20; 307/23; 307/31; 307/46
[58] Field of Search ............... 307/46, 64, 65, 66, 307/82, 86, 14, 18, 19, 20, 22, 23, 26, 13, 14, 44, 45, 48; 323/60, 61; 363/137

[56] References Cited

U.S. PATENT DOCUMENTS

| | | |
|---|---|---|
| 3,045,126 | 7/1962 | Morgan ................................. 307/14 |
| 3,337,743 | 8/1967 | Rolfes .................................... 307/64 |
| 3,515,894 | 6/1970 | Swing .................................... 307/64 |
| 3,991,319 | 11/1976 | Servos ................................... 307/64 |
| 4,010,381 | 3/1977 | Fickenscher ........................... 307/66 |
| 4,115,704 | 9/1978 | Hannemann ........................... 307/64 |

*Primary Examiner*—Richard A. Wintercorn
*Assistant Examiner*—S. D. Schreyer
*Attorney, Agent, or Firm*—Alfred G. Steinmetz

[57] ABSTRACT

A control arrangement for a three-phase, uninterruptible power supply generates timing signals to drive the static switches of inverters located in each phase. This control arrangement precisely controls the phase differences of the inverter signals with relation to each other so that while the overall three-phase power supplied by the inverters is nulled, power circulation through the inverters compensates for unbalanced output loads thereby maintaining balanced phase angles between the output voltage and a balanced input impedance at the input of the power supply.

2 Claims, 3 Drawing Figures

THREE-PHASE UNINTERRUPTIBLE POWER SUPPLY MAINTAINING RESERVE ENERGY SOURCES IN IDLING CONDITION WITH UNBALANCED LOADS

TECHNICAL FIELD OF THE INVENTION

This invention is concerned with three-phase, uninterruptible power supplies having a reserve energy source and is particularly concerned with maintaining balanced output phase angles in the presence of unbalanced loads and minimizing the energy required of the reserve energy source.

BACKGROUND OF THE INVENTION

Uninterruptible power supplies are utilized in applications requiring a reliable, continuous power supply such that the load does not see any input power outages or disturbances at the input to the power supply. Uninterruptible power supplies achieve this objective by utilizing a primary source of power which is augmented upon demand by a secondary source of power. Three phase uninterruptible power supplies typically achieve this objective by first rectifying the primary source of AC power in each phase to fully charge a battery which is part of a reserve power source. Circuitry is provided in series with the primary power path to invert the battery voltage to generate an output power signal. Due to the large filtering effect of the battery, the load is unaware of primary outages. This is inefficient because the power is processed in two successive steps, namely rectification and inversion.

One type of single phase uninterruptible power supply has overcome the aforementioned disadvantage by utilizing a double-shunted ferroresonant transformer to process the primary source of power in parallel with the secondary source of power.

A typical prior art uninterruptible power supply utilizing parallel power processing which is suitable for single-phase applications is shown in FIG. 1. Shown therein is an uninterruptible power supply utilizing a ferroresonant transformer 10. The primary power source is coupled to a primary power input winding 11. Normally the primary power supply comprises commercial AC supplied by a public utility. Secondary power is applied to the secondary power input winding 12. Normally the secondary power comprises a battery DC voltage source 13 and an inverter 17. The inverter is energized by the DC voltage source 13 and switching of the inverter switching devices is controlled by an inverter drive circuit 14.

A double-shunted ferroresonant transformer is used so that the two different input sources can be coupled in parallel to the output. Both input windings 11 and 12 are coupled to the output winding 16 through the inductances of their respective shunts 15a and 15b.

The flow of real power from either input winding to the output winding is proportional to the sine of the phase angle between the signal at the input and the signal at the output. Hence, by varying this phase angle, the flow of real power from either input winding 11 or 12 to the output winding 16 may be controlled. In the idling condition the inverter is operated so that its output signal is in phase at winding 12 with the power output signal on winding 16 and, hence, no power is delivered by the inverter to the output.

The switching devices in the inverter 17 are driven by the inverter drive circuit 14 which in turn is controlled with respect to the timing of the drive signals by the phase shift control circuit 18 and the system clock 23. The system clock is synchronized with the input AC when the signal is normally available. The phase shift control circuit 18, in the illustrative example of FIG. 1, is connected to a power sense circuit 19 which monitors power flow from the battery or reserve voltage source 13. The phase angle of the inverter output is modified until power flow from the battery 13 is nulled, hence, the inverter operates in an idling condition.

Should the primary power supplied to the primary input winding fail, an input monitor circuit 21 is connected to detect this loss of power and applies a signal to the clock 23 permitting it to run freely, and opens line switch 22, whereby the inverter, acting as a secondary power source, now supplies all power to the output. An example of a single-phase, uninterruptible power supply utilizing parallel power processing in inductively coupled circuits is found in U.S. Pat. No. 4,010,381 issued to H. Fickenscher et al, on Mar. 1, 1977 and assigned to the same assignee as this application.

The uninterruptible power supply system disclosed in the aforementioned Fickenscher patent is very advantageous from an efficiency standpoint. It is apparent to those skilled in the art that a parallel power processing system would be advantageous for use in three-phase uninterruptible power supplies. However, substituting the aforedescribed single phase inductively coupled system into a three-phase supply according to the prior art introduces difficulties in controlling the inverters appropriately in an idling condition. It is apparent to those skilled in the three-phase art that any imbalance in the loads would cause unequal phase shifts in each individual phase between the primary power source and the output load and this in turn would lead to an unbalanced three-phase output.

A three-phase uninterruptible power supply must be capable in general of supplying unbalanced loads. Therefore a proper control system of a three-phase uninterruptible power supply must be capable of maintaining balanced output voltage phase angles in the presence of unbalanced loads and in addition, must be capable of drawing power only from the primary power source during normal operation permitting the reserve power source to idle.

BRIEF SUMMARY OF THE INVENTION

Therefore, in solution to the above described phase angle balancing problem, a three-phase, ferroresonant uninterruptible power supply utilizes three inverters connected to a single voltage source and which operate as reserve power sources in each phase. A system of phase-locked oscillators, including a master phase-locked oscillator and a separate phase-locked oscillator for each phase, are utilized to control phase angles of each individual inverter to maintain 120 degrees phase displacements between the power supply outputs in each phase. The master phase-locked oscillator generates a set of three phase-balanced reference signals. Switching drive to each inverter is controlled by an individual phase-locked oscillator in such a manner as to keep its power supply output voltage locked in phase with its respective reference signal. The master phase-locked oscillator, by controlling the phase angles of the three-phase reference signals with respect to the three-phase primary source voltages determines the total power which is supplied by the primary power source to the output.

The master phase-locked oscillator in combination with the individual phase-locked oscillators in each phase, thus, maintains the output voltages of the uninterruptible power supply at fixed 120 degree phase displacements with respect to each other, and controls the power supplied to the output by the primary three phase source. In accomplishing this objective with unbalanced loads, the phase angles of the various inverter outputs and the power delivered by the three inverters, as well, must become unbalanced. By varying the power delivered by the three phase primary source the total power delivered by the inverters from the reserve voltage source can be nulled. This is accomplished by sensing the power delivered by the reserve voltage source and controlling the phase shift between the primary power source voltages and the output voltages in a closed loop feedback system. In accomplishing this with unbalanced loads, the phase angles of the individual inverters become unbalanced (not equal to 120 degrees), and hence may either supply or absorb power from the load.

During normal operation when reserve power is not required, the phase control operates necessarily to present a balanced load to the three-phase commercial supply. The individual phase-locked oscillators control the individual inverters such that they either supply or absorb power in response to an unbalanced load connected to the output of the power supply by varying the phase angles of their drive signals as needed to maintain the proper phase angles at the power supply output. Hence, by circulating power in the inverters the three-phase ferroresonant power supply maintains balanced three-phase output voltages with unbalanced loads and draws a balanced three phase load from the primary source in the presence of unbalanced loads at the output and achieves this without drawing any power from the secondary energy source as long as the primary energy source is available. As in the aforedescribed single-phase arrangement, when any irregularities in the commercial AC line are detected, the secondary voltage source supplies power to the output through the inverters.

DETAILED DESCRIPTION

Figure 1:
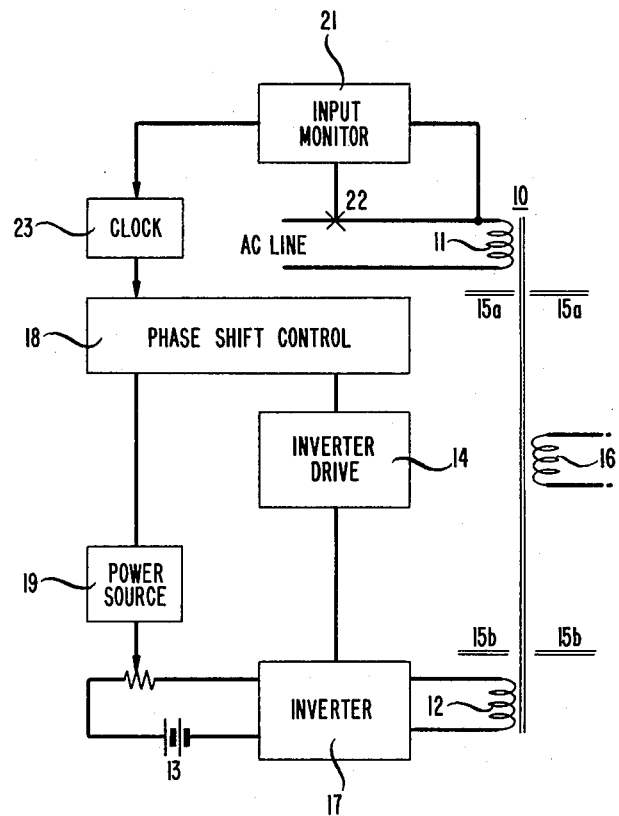
FIG. 1 discloses a single-phase uninterruptible power supply discussed hereinabove with reference to the background of the invention.
Figure 2:
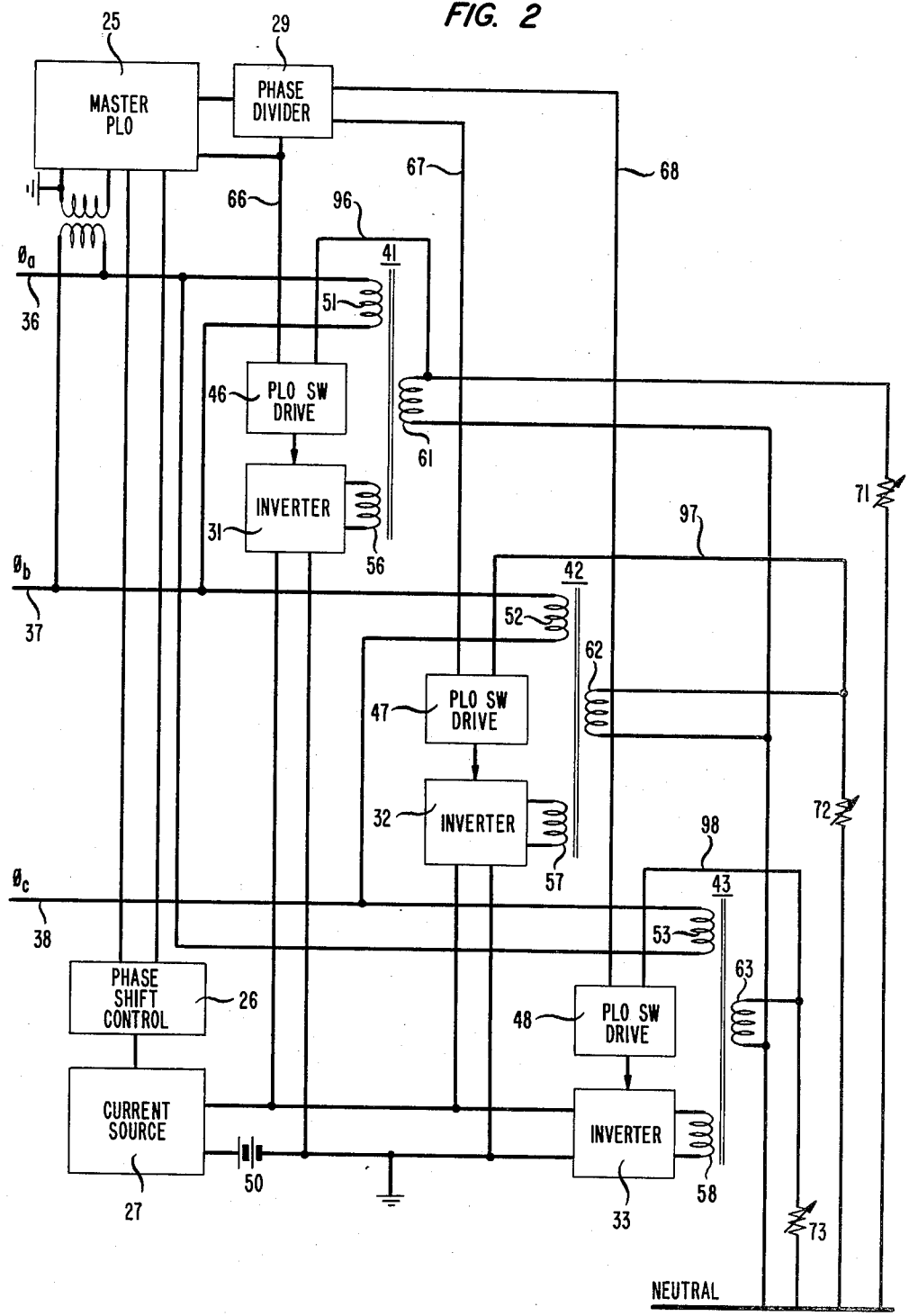
FIG. 2 discloses a three-phase uninterruptible power supply embodying the principles of the invention to achieve a three-phase output voltage balance with an unbalanced load.

The three-phase power supply shown in FIG. 2 includes three single phase ferroresonant transformers which are shown schematically by the indicated transformer cores 41, 42 and 43 for each phase respectively. Three input windings 51, 52 and 53 are connected in a delta configuration to the three-phase input power lines 36, 37 and 38 supplied by the utility power source. Each core additionally contains an input winding 56, 57 and 58 each adapted to accept a secondary power source comprising three inverters 31, 32 and 33 respectively. The inputs to inverters 31, 32 and 33 are connected to a common DC voltage source 50. Output windings 61, 62 and 63 of the three transformers are connected in a Y form and are coupled to loads 71, 72 and 73 which are shown connected in a line to neutral configuration. However, it is to be understood that the loads 71, 72 and 73 may also be connected in delta form, or any combination of line to neutral or line to line loads.

The phase angle of the output of each of the inverters 31, 32 and 33 is controlled by a phase-locked oscillator switching drive circuit 46, 47 and 48. This phase-locked oscillator switching drive circuit includes a phase-locked loop which maintains a fixed phase angle difference between a reference signal derived from the master phase-locked oscillator 25 and the power supply output voltage by supplying a drive signal to the inverter switches properly timed to achieve this result.

Master phase locked oscillator 25 receives an input signal from the input line 36 and 37 and delivers phase controlled reference signals on leads 66, 67 and 68. The master phase-locked oscillator 25 includes a phase shift control 26 which in turn is coupled to a current sense monitor 27 connected to sense the current output of the reserve battery voltage source 50. Phase shift control 26 operates to shift the phase of the master phase-locked oscillator output reference signals to null the current output from the voltage source 50. The master phase-locked oscillator 25, as can be seen, has its output applied to a phase divider 29 which produces three reference signals; one signal lead 66 is in phase with the signal phase output of the master phase-locked oscillator, and a second and third signal are phase shifted from the first signal by 120 degrees and 240 degrees on leads 67 and 68, respectively.

The three reference signals supplied by phase divider circuit 29 are supplied to the individual phase-locked oscillator switching drives 46, 47 and 48 in each phase respectively. These phase-locked oscillator switching drives compare to the individual output signal in each phase applied via line connection 96, 97 and 98 with the reference signal supplied by the master phase-locked oscillator. The phase-locked oscillator switching drives operate to drive the switching devices in the inverters 31, 32 and 33 in such a fashion so as to maintain the relative phase relation of the output voltages on windings 61, 62 and 63 in a balanced condition. Hence, the phase angle between the output voltages is maintained at an exact phase difference of 120 degrees.

Through these afore described connections, the master phase-locked oscillator 25 operates to switch or modify the phase of the output voltage relative to the phase of the primary source voltage in response to the phase shift control to null the power output of the battery. Hence, during normal operation, when the net power flow of the reserve source is nulled, the inverters 31, 32 and 33 have their switching devices driven so that the power supply output voltages are exactly 120 degrees apart.

It is apparent that, if the output load shown by the resistors is balanced, the power supplied or absorbed by the individual inverters is zero. However, if the output load is unbalanced, a power flow will exist between the inverter and the output winding in each individual phase. This power flow will be determined by the respective phases of the inverter voltage and the power supply output voltage. In this instance power may flow in either direction depending upon the respective phase angles. In those instances where the inverter phase leads the output phase the inverter will supply a power flow to the output. If the output phase leads the inverter phase, power will flow from the output into the inverter. Hence, a power flow will occur between the individual inverters 31, 32 and 33 and the individual output windings 61, 62 and 63 in each phase in such a fashion as to bring about a balance to the input impedance of the three-phase power supply as presented to the commercial three-phase line. As is apparent from the above description, the drive signals supplied by the individual phase-locked oscillator switching drives to each inverter keep the phase of the individual output voltages locked to a fixed signal phase established by the master phase-locked oscillator 25.

The total three-phase power delivered by the commercial power source is determined by the phase shift between the source and the reference signals generated by the master phase-locked oscillator 25. In the normal operating condition the net, or sum, power supplied by inverters 31, 32 and 33 from the battery voltage source 50 to the output of the three-phase power supply is nulled. While the total power output of the battery 50 is nulled, currents flow through the individual inverters in the instance where the output load is unbalanced. Hence, the inverters operatively convert an unbalanced load to a balanced one as far as the commercial three-phase line is concerned. While power circulates through the inverters, the net power drawn from the battery under normal operating conditions is zero. For example, if two of the load resistors 71, 72 and 73 are open-circuited, and the third draws full rated load for one phase, a power equaling two-thirds of the output power would flow from the inverter to the output winding in the phase connected with the resistor load. The other two inverters connected with the open-circuited loads each absorb one-third of the total power supplied at the input with the net result that total output of the reserve energy source to the load is zero despite the circulation of power between the inverters.

Figure 3:
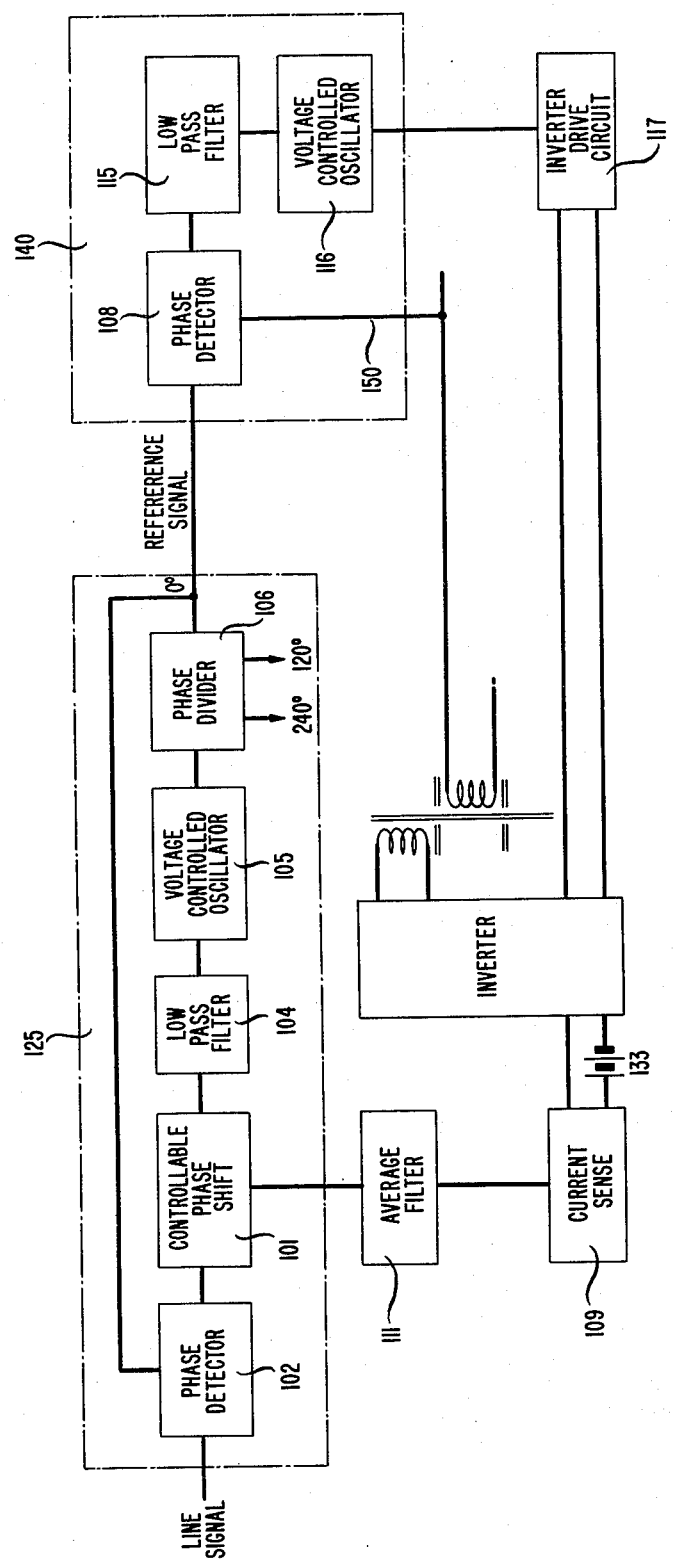
FIG. 3 discloses a phase control arrangement using phase-locked oscillators shown applied to one of the phases of the three-phase power supply shown in FIG. 2.

The phase-locked control arrangement is shown in more detail in FIG. 3. FIG. 3 discloses a portion of the signal phase control circuitry including the master phase-locked oscillator and a phase-locked oscillator included in one of the three phases. Since the other two phases are identical in circuitry and operation, they are not included in the schematic of FIG. 3.

The master phase-locked oscillator 125 includes a controllable phase shift control circuit 101 included in its closed loop arrangement. The controllable phase shift circuit 101 is connected at the output of the phase detector 102 and operates to apply a controllable DC voltage level to the output of the phase detector. The output of the phase detector 102 is a signal responsive to a phase difference between its two input signals representing the utility signal and a feedback signal respectively. Its output is applied, via the controllable phase shift circuit 101, to a low-pass filter 104 which generates an average value of DC voltage. This average value is applied to a voltage controlled oscillator 105 whose signal output is in turn applied to the phase divider circuit 106. The unshifted output of the phase divider 106 is fed back to the phase detector 102. Two other outputs at 120 degrees and 240 degrees are generated as reference signals for the other two phases.

The reference signal output at zero degrees of the phase divider 106 for the phase shown herein is applied to the phase detector 108 of the individual phase-locked oscillator 140 included in one phase of the three phase power supply. The output signals of the phase divider at 120 degrees and 240 degrees are applied respectively to the phase detectors of the individual phase-locked oscillators in the remaining two phases of the three-phase power supply.

The controllable phase shift circuit 101 in the master phase locked oscillator 125 is responsive to the current sense circuit 109 which senses the current output, of the reserve battery source 133. The power sense circuit has its output signal averaged by a filter 111. This signal is applied to the controllable phase shift 101. Controllable phase shift 101 responds to phase shift the reference signal output of the master phase-locked oscillator 125 in order to null the battery output. Phase-locked oscillator 125 may comprise either analog or digital components and operates in accord with the well-known principles of phase-locked oscillators. Inasmuch as phase-locked oscillators are well known in the art, it is not believed necessary to disclose this circuitry in detail.

The phase-locked oscillator 140 includes a phase detector 108 which is connected via lead 150 to the output signal of the power supply and to the output reference signal of the master phase-locked oscillator 125. A signal output representing the phase difference between the two is applied to a low-pass filter 115 which integrates it to derive an average, which in turn is applied to the voltage controlled oscillator 116. The output signal of voltage controlled oscillator 116 is utilized by the inverter drive circuit 117 to generate drive signals applied to the switching devices of the inverter 140.

As shown in FIG. 3 this phase-locked feedback loop maintains the power supply output voltage in precise phase relationship with the reference signal supplied by the master phase-locked oscillator. Its components may comprise analog or digital components.

While operating in this mode the three phase power supply operates with a very high efficiency and utilizes the afore described control circuitry to null power drawn from the reserve battery source. It is apparent from the foregoing description that this unique phase-locked control of the inverter phase assures that the output voltage phase angles of the power supply will remain balanced in the presence of unbalanced loads.

We claim:

1. A control system for a three-phase uninterruptible power supply having a ferroresonant power coupling transformer in each phase, an inverter circuit in each phase for generating reserve power signals, means for coupling a centralized DC voltage source to each of said inverter circuits and operative for coupling energy thereto, means for nulling total current flow from the centralized reserve voltage source to all the inverter circuits as a group, said means for nulling comprising:

a master phase-lock loop including phase detection means for synchronizing with a primary three-phase signal and including phase dividing means operative to generate a reference phase signal in each phase, separated from each other by $2\pi/3$ radians a first phase-lock loop in each phase operative to phase lock an output signal phase of the inverter to the reference phase signal in each phase, monitoring means for sensing a current output of the centralized DC voltage source, and controllable phase shift means connected in the master phase-lock loop and responsive to current flow sensed by the monitoring means to alter a signal output of the phase detection means and simultaneously shift all three reference phase signals uniformly and thereby simultaneously altering a phase of operation of all the inverters, whereby individual inverters may supply power to and or absorb power from an output of its ferroresonant power coupling transformer and the net total power flow is operative to null current flow in said means for coupling.

2. A control system as defined in claim 1 wherein: the first phase-lock loop arrangement includes a first phase detector responsive to one of the reference phase signals and to an output signal of the ferroresonant power coupling transformer whereby the inverter phase is adjusted to lock a power output in a phase to its associated reference signal in the same phase whereby the inverter supplies power to or absorbs power from an output of the ferroresonant power coupling transformer to permit a nulling of total current flow from the centralized reserve voltage source to all inverters in all three phases.

\* \* \* \* \*